P. J. JOECKEN.
PLANER FEED ATTACHMENT.
APPLICATION FILED SEPT. 11, 1911.
1,043,436.
Patented Nov. 5, 1912.
4 SHEETS—SHEET 1.
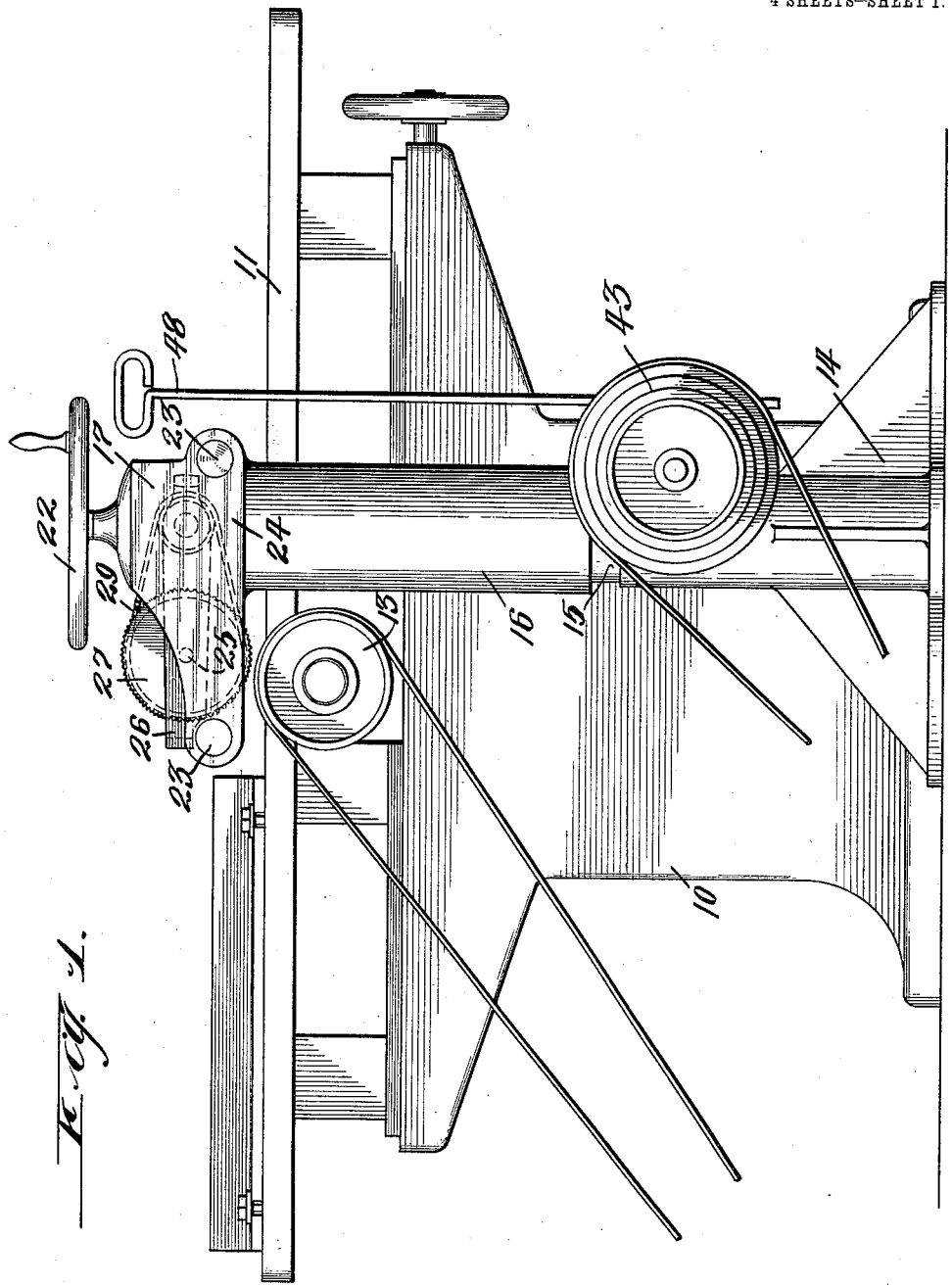
Witnesses
Inventor:
Peter J. Joecken
by Morsell & Caldwell
Attys.

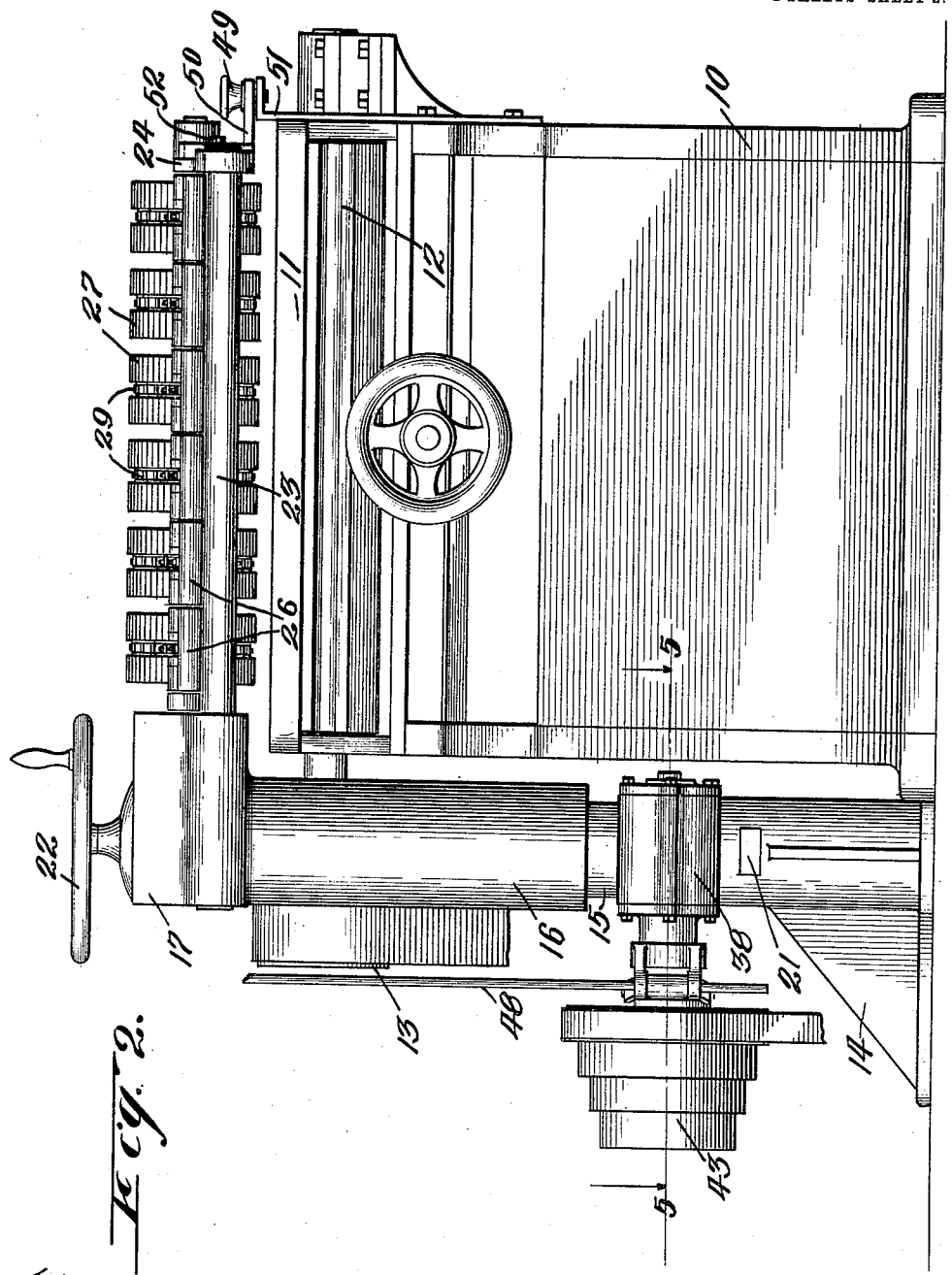

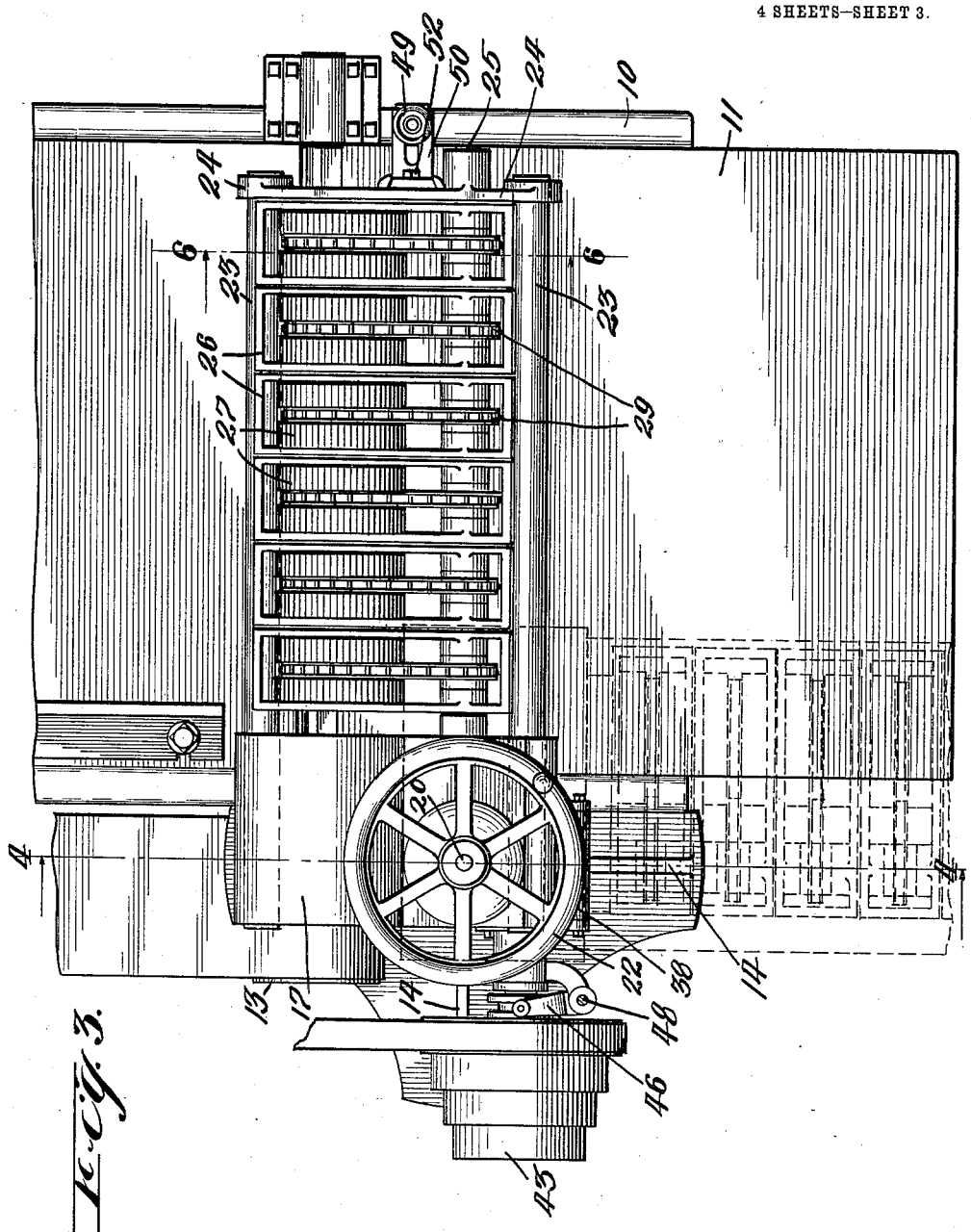

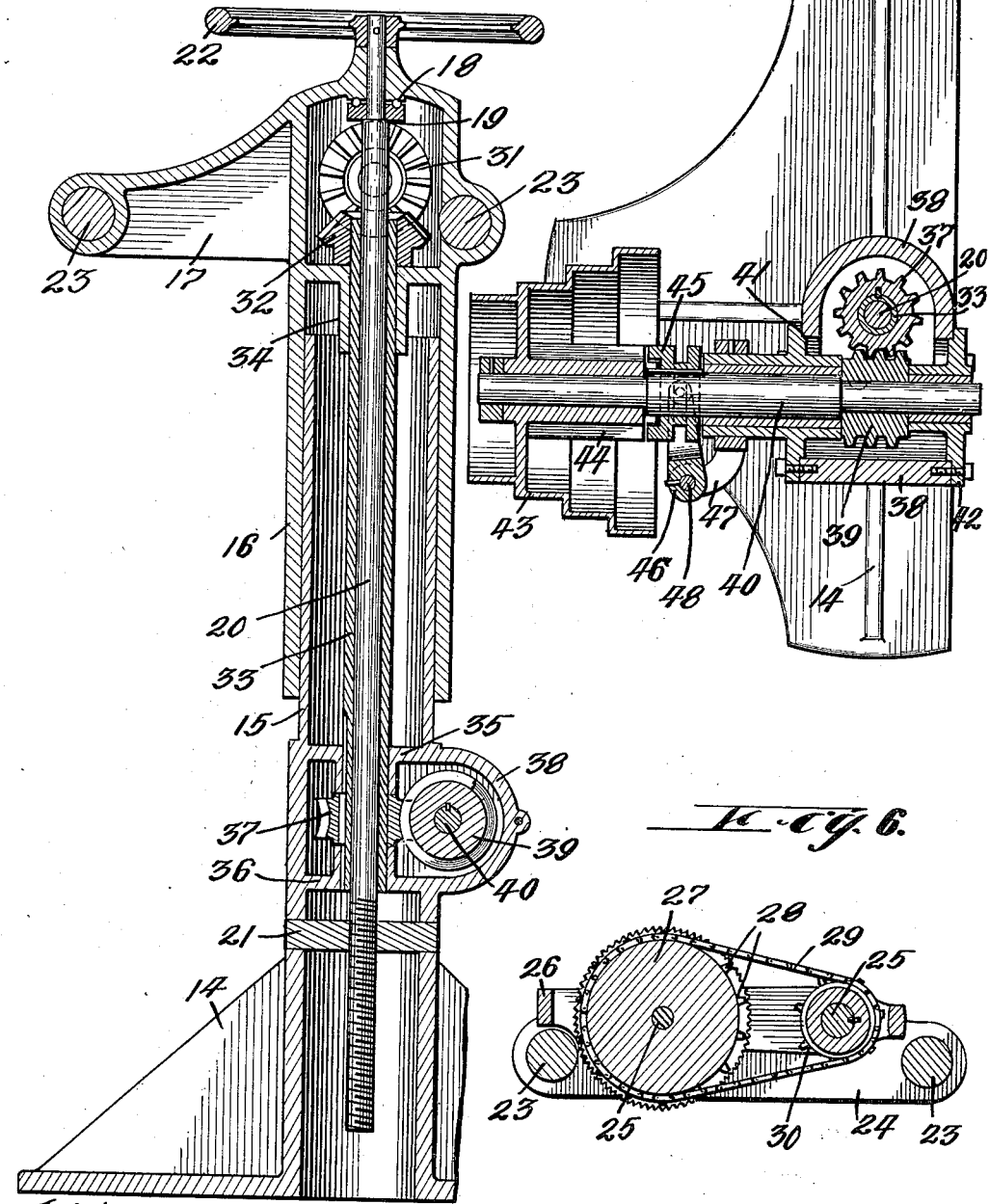

UNITED STATES PATENT OFFICE.

PETER J. JOECKEN, OF SHEBOYGAN FALLS, WISCONSIN, ASSIGNOR TO FALLS MACHINE COMPANY, OF SHEBOYGAN FALLS, WISCONSIN, A CORPORATION OF WISCONSIN.

PLANER FEED ATTACHMENT.

1,043,436.  Specification of Letters Patent.  Patented Nov. 5, 1912.

Application filed September 11, 1911. Serial No. 648,792.

*To all whom it may concern:*

Be it known that I, PETER J. JOECKEN, a citizen of the United States, and resident of Sheboygan Falls, in the county of Sheboygan and State of Wisconsin, have invented new and useful Improvements in Planer Feed Attachments, of which the following is a description, reference being had to the accompanying drawings, which are a part of this specification.

This invention has for its object to provide an attachment for undercut planers which will serve the purpose of a feeding mechanism such as shown in my Letters Patent No. 908,269, dated December 29, 1908, and which will be capable of being quickly moved out of its operative position so as to clear the table when it is desired to feed work by hand.

Another object of this invention is to improve upon details of construction of such attachment, whereby it may be applied to any planer table without having to fit parts or to make alterations therein, and whereby the shifting of the attachment from its operative position to its inoperative position may be accomplished without disconnecting the driving mechanism therefor.

With the above and other objects in view the invention consists in the feeder attachment for planers as herein claimed and all equivalents.

Referring to the accompanying drawings in which like characters of reference indicate the same parts in the different views: Figure 1 is a rear elevation of a planer having the feed attachment of this invention applied thereto in its operative position; Fig. 2 is an end view thereof; Fig. 3 is a plan view thereof, the inoperative position of the attachment being shown in dotted lines; Fig. 4 is a longitudinal sectional view of the supporting post of the attachment and the driving and adjusting mechanism therein, being taken on the plane of line 4—4 of Fig. 3; Fig. 5 is a sectional plan view on the plane of line 5—5 of Fig. 2; and Fig. 6 is a transverse sectional view through the feed mechanism on the plane of line 6—6 of Fig. 3.

In these drawings 10 indicates the base of an ordinary undercut planer and 11 is the table thereof, beneath which the usual cutter 12 is driven by a belt pulley 13 in the well known manner. Details of construction of the planer have not been shown as the attachment constituting this invention is applicable to any type of planer construction.

A pedestal 14 is adapted to be secured to the floor alongside of the planer, at the rear thereof, as shown, and, as will be most clearly seen in Fig. 4, this pedestal comprises a vertical tubular column or standard 15, which is telescoped by a tubular sleeve 16 carrying a head 17. The sleeve 16 is adjustable on the column 15 as the closed upper end thereof rests on a ball bearing which is seated on a shoulder 19 of a vertical screw rod 20 which is threaded at its lower end in a block 21 fitting in openings through the base of the column, said screw rod extending through the top of the sleeve and being provided with a hand wheel 22 by means of which it may be turned. The turning of the hand wheel 22 threads the rod 20 through the nut formed by the block 21 and so lifts or lowers the sleeve 16 and the parts carried by it.

A pair of parallel horizontal bars 23 pass through openings provided for them in the head 17 and together with said head and an end plate 24 connecting them at their outer ends form a rectangular frame for the several driving units, of which there may be any number, according to the width of the planer table. A driving shaft 25 extends the full length of the attachment frame, being journaled in the end plate 24 at one end and in the head 17 at the other end, where it enters the upper end of the sleeve 16 to receive its driving connection to be later referred to. As best seen in Figs. 3 and 6, this driving shaft 25 forms a pivotal support for a number of swinging frames 26, each carrying a heavy feed roll 27 with sprocket teeth 28 formed thereon, which are connected by a chain 29 with a sprocket wheel 30 keyed on the drive shaft 25. Thus the frames 26 are free to swing on the shaft 25 and the feed rolls 27 are positively driven from the shaft 25 while the swinging movement of the frame is limited by the outer end thereof engaging one of the bars 23. The feed rolls 27 are in this manner mounted to yield vertically so as to engage lumber of different thickness, and they are toothed or roughened to engage the lumber and force it over the cutter. The adjustment of the attachment by turning the hand wheel 22 is made to lift the attachment frame to the desired distance above the table to permit the lumber to pass beneath it.

A bevel gear 31 on the drive shaft 25 within sleeve 16 meshes with a bevel gear 32 on the upper end of a sleeve 33 which surrounds the screw rod 20 and is supported in a bearing 34 within the sleeve 16 and a bearing 35 within the column 15. Between the bearing 35 and another bearing 36 formed in the column, there is a worm wheel 37 which is held in place by its engagement with these bearings and which is splined on sleeve 33 so as to maintain its drive connection therewith in any vertical adjustment of the attachment. The column 15 forms a housing 38 on one side thereof between the bearings 35 and 36 for containing a worm 39 meshing with the worm wheel 37, and said worm is keyed on a countershaft 40 which is journaled in babbitted bearing plates 41 and 42 which close the ends of the housing 38. A cone pulley 43 is loosely mounted on the end of shaft 40 and is provided with clutch teeth 44 to be engaged by a clutch member 45 which is splined on the shaft 40 and is thrown into or out of engagement by a yoke 46 pivotally mounted on a bracket 47 extending from bearing plate 41. A clutch rod 48 is secured to the yoke 46 so that by turning it the clutch may be thrown into or out of its driving engagement.

In operation the feeder attachment is swung to its position over the table, the sleeve 16 freely turning upon column 15 for this purpose. The attachment is then adjusted to the proper elevation by turning the hand wheel 22 and the outer end of the frame of the attachment is then desirably fastened in position by means of a hand screw 49 carried by a bracket 50 on the end plate 24 threading into the upper end of a strap 51 which is secured to the frame of the planer. The bracket 50 is slidable in ways on the end plate 24 and is held by a set screw 52 so as to allow for the adjustments of the attachment frame above the table. It is then only necessary to throw the clutch to its engaged position by means of the clutch rod 48, when all of the feed rolls are set in motion through the driving connection comprising the shaft 40, the engaged worm 39 and the worm wheel 37, the sleeve 33, the engaged beveled gears 32 and 31, the shaft 25 and the chain connections therefrom to the feed rolls.

When it is desired to feed work by hand the attachment is released by removing the hand screw 49 and is swung to the back of the table, as shown by dotted lines in Fig. 3, where it is out of the way, and this movement of the attachment to its inoperative position, as well as the vertical adjustment thereof, may be accomplished without hindrance by the driving connections.

What I claim as new and desire to secure by Letters Patent, is:

1. A feed attachment for planers or the like, comprising a standard, a sleeve telescoping therewith, a frame carried by the sleeve, a shaft mounted on the frame, feed rolls carried by the frame and driven from the shaft, a screw rod extending through the sleeve, a nut on the standard in which the screw rod is threaded, said sleeve having engagement with the screw rod to be supported thereby, means for turning the screw rod, a sleeve surrounding the screw rod, a bevel pinion thereon, a bevel pinion on the shaft meshing therewith, a worm gear splined on the sleeve which carries the bevel pinion, a countershaft journaled in the standard, a worm on the countershaft meshing with the worm gear, and means for turning the countershaft.

2. A feed attachment for planers or the like, comprising a tubular standard adapted to be positioned at the side of a planer, a sleeve telescoping the upper end thereof, a head on the upper end of the sleeve, horizontal bars extending from the head parallel with relation to each other, an end plate connecting the ends of the horizontal bars, a shaft journaled in the end plate and the head of the sleeve, frames pivotally mounted on the shaft, feed rolls carried by the frames, sprockets on the shaft, driving chains connecting the sprockets with the feed rolls, a bracket adjustably mounted on the end plate, a strap adapted to be secured to the planer, a clamping screw connecting the bracket with the strap, a shouldered screw rod extending through the sleeve and standard, a nut block fitting in openings of the standard and having the screw rod threaded therein, the head of the sleeve bearing on the shoulder of the screw rod, a hand wheel on the screw rod above the head of the sleeve by which the screw rod may be turned by adjusting the elevation of the sleeve, a driving sleeve surrounding the screw rod, intermeshing beveled gear wheels on the shaft and the driving sleeve respectively, a worm gear splined on the driving sleeve, a worm housing within the standard and meshing with the worm gear, a countershaft journaled through the worm housing of the standard and having the worm keyed thereon, and a clutch pulley driving connection on the countershaft.

In testimony whereof, I affix my signature, in presence of two witnesses.

PETER J. JOECKEN.

Witnesses:
LEO McKENNA,
H. C. LANDWEHR.

Copies of this patent may be obtained for five cents each, by addressing the "Commissioner of Patents, Washington, D. C."